United States Patent [19]

Scholer

[11] Patent Number: 4,646,218

[45] Date of Patent: Feb. 24, 1987

[54] SELF-ADJUSTING SWITCHED MODE POWER SUPPLY

[75] Inventor: Kenneth C. Scholer, Dundee, Ill.

[73] Assignee: Zenith Electronics Corporation, Glenview, Ill.

[21] Appl. No.: 726,261

[22] Filed: Apr. 23, 1985

[51] Int. Cl.[4] ........................................... H02M 3/335
[52] U.S. Cl. ...................................... 363/21; 363/97; 363/131
[58] Field of Search ...................... 363/20, 21, 97, 131

[56] References Cited

U.S. PATENT DOCUMENTS 4,228,493  10/1980  de Sartre et al. ..................... 363/56

OTHER PUBLICATIONS

"Flyback Converters: Solid-State Solution to Low--Cost Switching Power Supplies", by Robert J. Boschert, Electronics, Dec. 21, 1978, vol. 51, No. 26.

Primary Examiner—Peter S. Wong
Assistant Examiner—Anita M. Ault

[57] ABSTRACT

In a switched mode power supply wherein an integrated circuit (IC) controller monitors and regulates power supply operation, a self-adjusting circuit compensates for variations in controller operation and ensures stable power supply operation. The output voltage of the power supply's transformer is compared to a reference voltage in generating an error signal which is fed back to the controller IC for regulating its operation. The self-adjusting circuit is impedance-matched with and provides an extremely high DC control gain to the controller IC's control input pin so as to simulate a manual adjustment arrangement, the need for which is eliminated by the automatic, self-adjusting circuit which maintains the AC impedance defined to ensure stable operation of the switched mode system.

5 Claims, 1 Drawing Figure

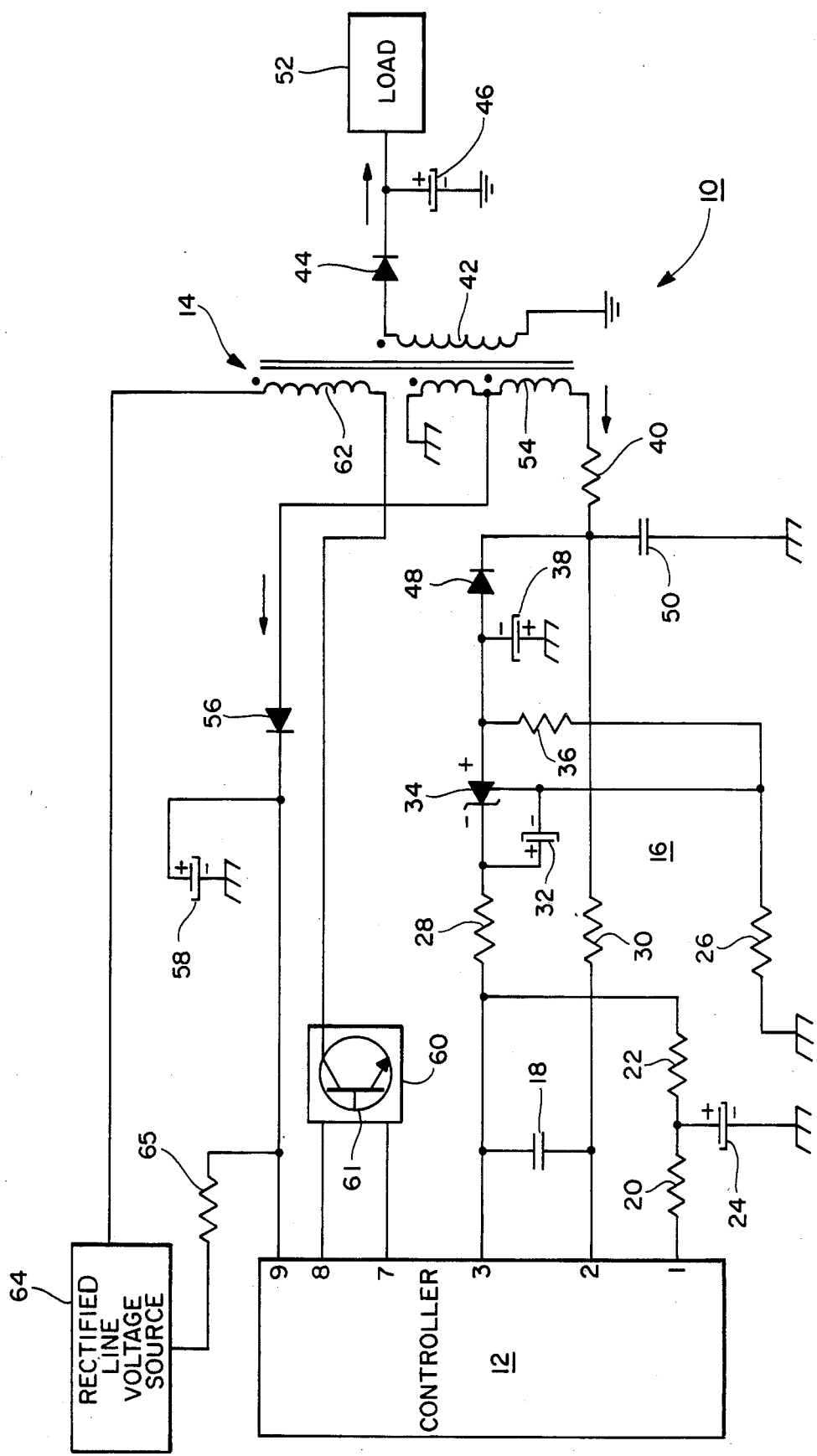

SELF-ADJUSTING SWITCHED MODE POWER SUPPLY

BACKGROUND OF THE INVENTION

This invention relates generally to switched mode power supplies and is particularly directed to an arrangement for automatically correcting for variations in the operation of a controller circuit in a switched mode power supply.

A switched mode power supply generally includes at least the following components: a switch, an inductor, a rectifier, a capacitor and a load. During that portion of the period in which the switch conducts, a current originating from an input voltage source passes through the inductor so that energy which is derived from this source is stored in the inductor. During the other part of the period, in which the switch is nonconducting, the energy stored in the inductor produces a current through the rectifier, which current recharges the capacitor and also replenishes the energy losses arising from the load. By adjusting the conducting period of the switch relative to the length of the cycle, the output DC voltage across the load can be independent of various power supply inputs.

Various control circuits have been devised for regulating the operation of the conducting period of the switch which typically is a transistor. These control circuits monitor and control various operating parameters of the power supply such as the rectified AC line voltage provided thereto, the duty cycle of the switching transistor, the DC output voltage, etc. For various reasons including reduced space, reduced power consumption, increased reliability, and a reduction in heat generated by the power supply, these control circuits are increasingly of the integrated type. One example of such an integrated control circuit for use in a switched mode power supply is disclosed in U.S. Pat. No. 4,228,493. Various operating parameters are provided to these integrated control circuits which respond by providing various control outputs for regulating power supply operation.

Switched mode power supply integrated circuit controllers, however, generally exhibit variations in their own operating characteristics. Variations between individual controller chips of the same type arise from production run variations in their manufacture. For example, these controllers generally output a first reference voltage which is compared with a second voltage representing the power supply's output for providing a correction signal back to the controller in regulating power supply operation. This reference voltage may vary from time to time or may be different for different controllers. In addition, variations in the operation of the external circuitry to which the reference voltage is provided may give rise to additional variation in controller operation and power supply outputs. The prior art has addressed these variations and instabilities in power supply controller operation by providing a manual adjustment, typically in the form of a potentiometer, in attempting to achieve predictable, stable operation of the power supply under various operating conditions. One example of such a manual adjustment by means of a potentiometer can be found in the Dec. 21, 1978 issue of *Electronics* in an article entitled "Flyback Converters: Solid-state Solution to Low-Cost Switching Power Supplies." However, this manual adjustment is time consuming, introduces the possibility of human error, and, because it requires human intervention, increases the manufacturing cost of the power supply.

The present invention is intended to overcome the aforementioned limitations of the prior art by providing a self-adjusting switched mode power supply which automatically compensates for variations in power supply controller operation. The correction circuit of the present invention provides a highly accurate error signal to the controller which is independent of controller circuit operation and closely tracks variations in power supply output.

OBJECTS OF THE INVENTION

Accordingly, it is an object of the present invention to provide improved control and operating stability in a switched mode power supply.

It is another object of the present invention to automatically correct for variations in the operation of a switched mode power supply controller.

Yet another object of the present invention is to eliminate the requirement of manually correcting for variations in the controller circuit of a switched mode power supply.

A further object of the present invention is to provide an automatic control and correction circuit for a switched mode power supply which replaces a manually adjustable circuit without requiring modification of the power supply.

A still further object of the present invention is to regulate the operation of an integrated circuit controller in a switched mode power supply wherein the controller is responsive to an error signal which closely tracks variations in the power supply's output voltage.

BRIEF DESCRIPTION OF THE DRAWING

The appended claims set forth those novel features which characterize the invention. However, the invention itself, as well as further objects and advantages thereof, will best be understood by reference to the following detailed description of a preferred embodiment taken in conjunction with the accompanying drawing, in which is shown in simplified schematic and block diagram form a self-adjusting switched mode power supply in accordance with the principles of the present invention.

DETAILED DESCRIPTION OF THE PREFERRED EMBODIMENT

Referring to the Figure, there is shown in simplified block and schematic diagram form a self-adjusting switched mode power supply 10 in accordance with the present invention. The switched mode power supply 10 includes a controller integrated circuit (IC) 12 which exercises control over the switched mode power supply. The controller IC 12 continuously monitors various power supply conditions and operating parameters such as the rectified AC mains voltage, the input voltage, the output voltage as well as checking for short circuits in the power supply. Various controller IC's are commercially available, with the present invention intended for use with the 221-291 controller IC, one version of which is manufactured by Siemens Aktiengesellschaft under the designation TDA 4600. However, the present invention is not limited to operation with this specific integrated circuit controller, but will operate equally well with virtually any switched mode power supply integrated circuit controller.

The controller IC 12 is coupled via resistor 65 to a rectified line voltage source 64 for the supply start up. Controller IC 12 also monitors the rectified line voltage by checking the proportional voltage developed on the positive end of capacitor 58. In addition, the rectified line voltage source 64 delivers a DC input voltage to the primary winding 62 of a switching transformer 14 within the switched mode power supply 10. Also coupled to the primary winding 62 of the transformer 14 is a drive control circuit 60 which typically includes a switching transistor 61. The switching transistor 61 within the drive control circuit 60 is rendered conductive by an output pulse from the controller 12 provided to its base. With the switching transistor 61 thus rendered conductive, current flows through the primary winding 62 from the rectified line voltage source 64 so that energy which is derived from this source is stored in the primary winding of the transformer. The transformer 14 further includes a secondary output winding 42 and a feedback winding 54 which are electromagnetically coupled to the primary winding 62. A self-adjusting control circuit 16 is coupled between the feedback winding 54 and the controller IC 12 and is described in detail below. The energy stored in the primary winding 62 induces current flow within the secondary output winding 42 and the feedback winding 54 when the switching transistor is turned off, with the sense and magnitude of the thus induced currents depending upon the polarity and relative number of turns in each of these windings. With the switching transistor 61 periodically brought into alternately the conducting and cut-off state by an appropriate output from the controller IC 12, during that portion of this period when the switching transistor is nonconducting, the energy stored within the primary winding 62 produces a current via the secondary output winding 42 through a rectifying diode 44, which current recharges a capacitor 46 and, consequently, replenishes the energy losses caused by a load 52 driven by the switched mode power supply 10. The load 52 may be virtually any conventional electrical or electronic apparatus which operates from a DC input voltage.

The controller IC 12 is characterized as providing a DC reference voltage on one of its output pins, this output pin being designated as pin 1 in the present case, and as being responsive to a regulating input at its pin 3. Resistors 20, 22 and grounded capacitor 24 coupled between pins 1 and 3 of the controller IC 12, convert the reference voltage output from pin 1 to a current which is provided to pin 3 in providing the controller IC with a reference signal for its stable operation. However, variation in the operation of controller IC 12 may give rise to changes in its pin 1 output resulting in even more variation in its operation. The present invention is intended to eliminate this source of controller IC operational instability. In addition, resistors 20, 22 and capacitor 24 provide a delay in the signal which is provided to the controller's pin 3 following the turn-on of the switched mode power supply 10 in response to receipt of a DC input voltage from the rectified line voltage source 64. This delay prevents the input control signal provided to the controller IC 12, pin 3, from appearing as a short circuit upon initiation of operation of the power supply or of terminating its operation in a synchronized manner.

Resistor 36 couples the junction of resistor 26 and the adjustable Zener diode's control terminal to its anode. The cathode of the adjustable Zener diode 34 is coupled to pin 3 of the controller IC 12 via a resistor 28. A capacitor 32 is coupled between the control input terminal and the cathode of the adjustable Zener diode 34.

A signal which tracks the output voltage provided to the load 52 is induced in the feedback winding 54 by the energy stored by the primary winding 62 being "dumped". This signal is provided from the feedback winding 54 via resistors 30 and 40 to pin 2 of the controller IC 12. This crossover signal indicates when the transformer 14 has lost all of its stored energy and is ringing. This information is used by the controller IC 12 for turning the switching transistor 61 ON and initiating another operating cycle of the switched mode power supply. In addition, the junction of resistors 30 and 40 is coupled to the adjustable Zener diode's anode by means of a grounded capacitor 38 and a diode 48. The negative voltage at the anode of the adjustable Zener diode 34 is proportional to the output voltage and is used by the self-adjusting control circuit 16 in the following manner to ensure stable operation of the switched mode power supply 10.

When a positive voltage appears on the transformer's secondary winding 42, capacitor 46 is charged to a voltage proportional to the voltage across the feedback winding 54. Thus, when diode 44 is conducting, diode 48 is also conducting. The relationship between the voltages across diodes 44 and 48 may be established by the turns ratio between the secondary and feedback windings 42, 54 in a conventional manner. Normally, the voltage across the feedback winding 54 causes a −23 volt DC level to appear at the negative side of grounded capacitor 38. The peak negative voltage at the anode of the adjustable Zener diode 34 is thus proportional to and closely tracks the output voltage provided to the load 52.

The reference voltage output from pin 1 of the controller IC 12 is typically 4 VDC. Resistors 20 and 22 and the cathode current of the adjustable Zener diode 34 together drop this voltage down to a value of 2 VDC which is provided to pin 3 of the controller IC 12 to ensure proper operation thereof. The reference voltage within the adjustable Zener diode 34 is established at 2.5 VDC. It is this voltage which serves as a reference voltage for the self-adjusting circuit 16, with pin 1 of the controller IC 12 providing only a current to the self-adjusting circuit 16 which is not used as a reference voltage therein. As the voltage at pin 1 of the controller IC 12 increases, the voltage across resistor 36 will similarly increase resulting from the increased current within the adjustable Zener diode 34. Since the voltage at the anode of the adjustable Zener diode 34 is proportional to the output voltage provided to the load 52, the adjustable Zener diode will conduct increasing currents as the output voltage exceeds predetermined limits. For example, under normal operating conditions, a −23 volt DC level is established across capacitor 38. The voltage at the junction of resistors 26 and 36 is approximately −20.5 VDC (−23.0+2.5). If the voltage across capacitor 38 goes more negative, the adjustable Zener diode 34 turns on harder providing increased current through resistor 28. This causes a larger voltage drop across resistors 20 and 22 due to the increased current flowing from resistor 28 resulting in a reduction in the voltage at the controller IC's control input pin 3. The reduced voltage provided to pin 3 of the controller IC 12 causes it to operate the switching transistor 61 such that a reduced current flows through the primary winding 62. This, in turn, results in a reduction in the output voltage provided to the load 52. When the voltage at the anode of the adjustable Zener diode 34 decreases to within 2.5 VDC of the voltage at the junction of resistors 26 and 36, the voltage at pin 3 of the controller IC 12 arising from current in the adjustable Zener diode will stabilize resulting in the correct output voltage. Resistor 28 and capacitor 32 provide impedance matching between the adjustable Zener diode 34 and pin 3 of the controller IC 12. By using resistors 36, 26 and 28 in combination with capacitor 32 and adjustable Zener diode 34 together in the manner suggested causes an extremely high DC control gain while keeping the AC impedance defined so as to keep the switch mode system stable. In a preferred embodiment, the values of resistor 28 and capacitor 32 are selected in order for the adjustable Zener diode 34 to appear as a 6.2 kilohm impedance at the regulator operating frequency for ensuring stable operation of the controller IC 12.

There has thus been shown a self-adjusting switched mode power supply which compensates for variations in the power supply's integrated circuit controller as well as for changes in the output voltage of the power supply. The self-adjusting circuit is impedance-matched with the controller IC's control input pin so as to simulate, and eliminate the need for, a manual adjustment arrangement. The extremely high DC control gain of an error signal provided by the self-adjusting circuit to the IC controller maintains the AC impedance so as to ensure stable operation of the switched mode system.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. In a switched mode power supply including a switching transformer having a primary winding and a secondary winding, wherein the base current in a switching transistor connected in series with said primary winding regulates the energy stored in said primary winding for inducing an output voltage across said secondary winding, a self-adjusting control circuit comprising:

an integrated circuit controller connected to said switching transistor for providing a drive signal to the base thereof for controlling the current therein, said integrated circuit controller further providing a first reference voltage output signal;

feedback means coupled to said primary winding and responsive to the current therein for generating a feedback signal representing said output voltage;

automatic comparison means coupled to said integrated circuit controller and to said feedback means for comparing said reference voltage output signal and said feedback signal and for providing an error signal to said integrated circuit controller when the difference between said reference voltage output signal and said feedback signal exceeds a predetermined voltage value in regulating the operation of said integrated circuit controller; and impedance matching means for coupling said automatic comparison means to said integrated circuit controller.

2. The self-adjusting control circuit of claim 1 wherein said feedback means includes a feedback winding in the switching transformer electromagnetically coupled to the primary winding of the switching transformer.

3. The self-adjusting control circuit of claim 1 wherein said automatic comparison means includes a voltage reference source responsive to the first reference voltage output signal of said integrated circuit controller and an error amplifier coupled to said feedback means.

4. The self-adjusting control circuit of claim 3 wherein said error amplifier includes an adjustable Zener diode having a characteristic second reference voltage for providing an error signal to said integrated circuit controller when the difference between said reference voltage output signal and said feedback signal exceeds said second reference voltage.

5. The self-adjusting control circuit of claim 1 wherein said impedance matching means includes a capacitor and a resistor.

* * * * *